United States Patent [19]

Chen

[11] Patent Number: 4,632,222

[45] Date of Patent: Dec. 30, 1986

[54] SCAFFOLD WITH LOCKING MEANS

[76] Inventor: Eugene Chen, No. 41, Sanshe Rd., ShenKang Hsiang, Taichung, Taiwan

[21] Appl. No.: 821,603

[22] Filed: Jan. 23, 1986

[51] Int. Cl.[4] .......................... E04G 1/08; E04G 1/20; A47F 5/00
[52] U.S. Cl. ..................................... 182/179; 182/119; 211/192; 248/222.1; 403/317
[58] Field of Search .............. 182/119, 118, 179, 178; 211/192, 191; 248/222.1; 403/317–319

[56] References Cited

U.S. PATENT DOCUMENTS

| | | | |
|---|---|---|---|
| 3,273,720 | 9/1966 | Seiz | 211/192 |
| 3,392,848 | 7/1968 | Mc Connell | 211/192 |
| 3,612,290 | 10/1971 | Evans | 211/192 |
| 3,702,137 | 11/1972 | Evans | 211/192 |
| 3,986,318 | 10/1976 | McConnell | 211/192 |
| 4,262,809 | 4/1981 | McConnell | 211/192 |

FOREIGN PATENT DOCUMENTS 516708  9/1955  Canada ............................... 182/119

Primary Examiner—Reinaldo P. Machado
Attorney, Agent, or Firm—McGlew and Tuttle

[57] ABSTRACT

A scaffold assembly that can be disassembled and reassembled is provided with spring locking members which are attached releaseably in vertical mounting pieces supporting a shelf and which can engage in the attachment holes of vertical struts to lock the vertical mounting pieces against movement relative to the vertical struts.

5 Claims, 7 Drawing Figures

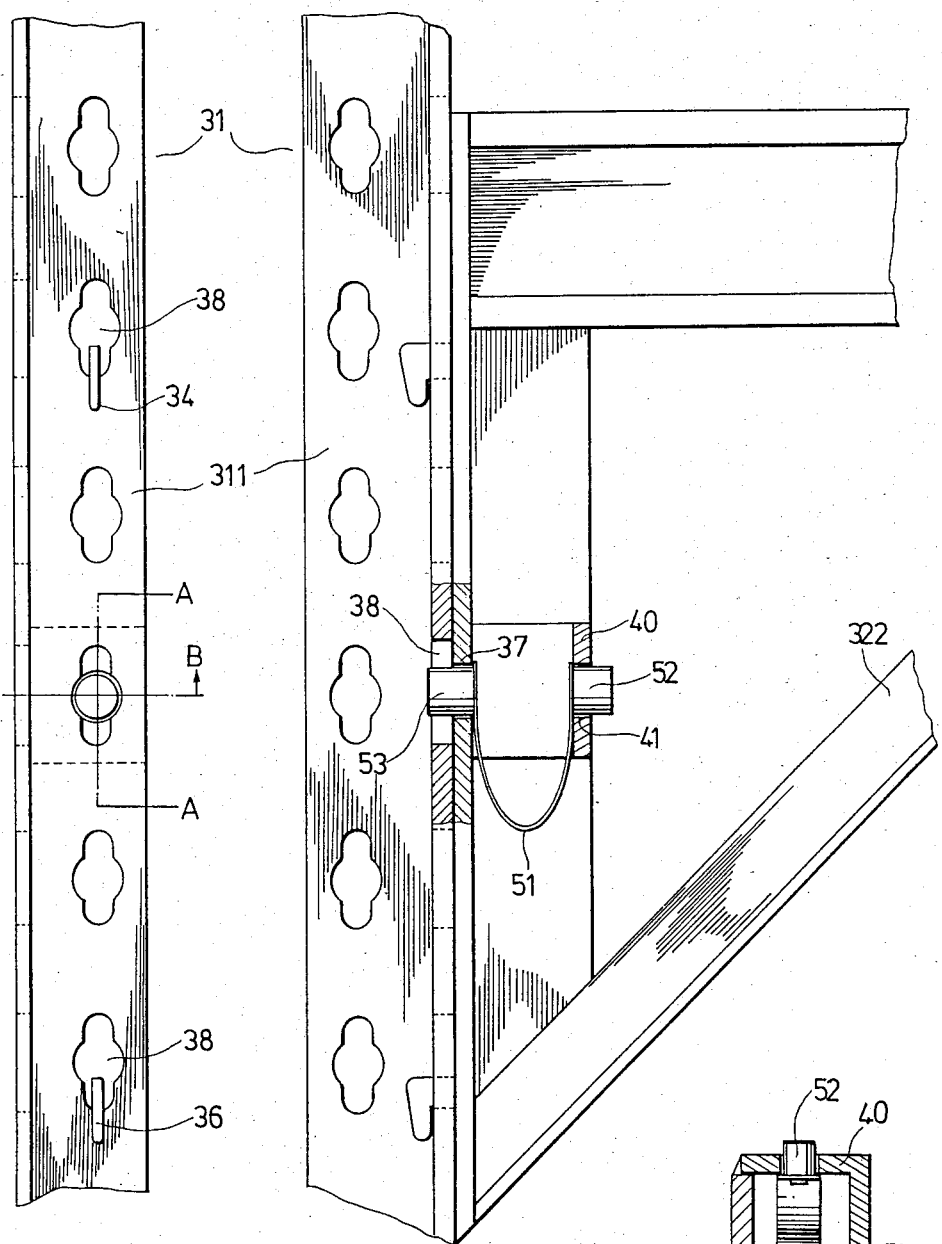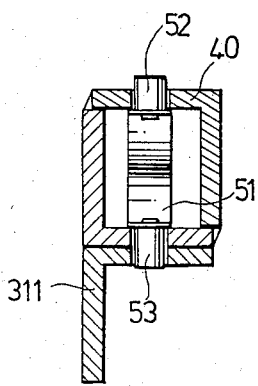

SCAFFOLD WITH LOCKING MEANS

BACKGROUND OF THE INVENTION

This invention relates to a scaffold used by workmen to stand and sit on or to support things when they are working, particularly to a safety scaffold which can be disassembled and reassembled and has a novel locking means to make the scaffold more stable.

A typical scaffold is shown in FIGS. 1 and 2, wherein four vertical struts 10 of L-shaped cross-section hold horizontal shelves 22 at appropriate intervals by means of horizontal bars 20 incorporating vertical mounting members 21 and brace members 23. The vertical mounting members 21 are provided with hook means 24 which engage in the appropriate attachment holes 11 of the vertical struts. The attachment holes 11 are provided at intervals along the length of the vertical struts so that the level of the shelves 22 can be adjusted. For easy access to the attachment holes 11, these holes 11 are substantially in an oblong shape. The oblong holes 11 cannot keep the hook means immobilized since there is a relatively large space around the hook means to permit its movement. Consequently, the shelf supported by the horizontal bar which in turn is held in position by the engagement of the hook means and the attachment holes cannot be kept stable effectively. For instance, when one stands on one side of the shelf, the other side of the shelf as well as the hook means below it will be caused to rise to some extent (the directions of the movement of the shelf are shown by arrows in FIG. 2). Such a condition wll sometimes make the hook means release from the attachment holes, causing the shelf to fall down.

SUMMARY OF THE INVENTION

An object of the invention is to provide a safety scaffold assembly that can overcome the above-described disadvantages.

The invention provides a scaffold of the above-described type with a novel locking means which includes angle plate means of L-shaped cross-section having two opposite edges welded to two opposite edges of the vertical mounting piece to define a rectangular space, the angle plate means having a first opening in one of its sides, and the vertical mounting piece having a second opening opposite to said first opening. A spring plate which is bent to a V-shape with a round edge and has two protrusions of circular cross-section at its opposite ends, is inserted between the angle plate means and the vertical mounting piece to project the protrusions into the first and second openings. One of the protrusions which projects in the second opening is adapted to extend in and to be fitted snugly in the expanded circular mid-portion of one of the attachment holes when the vertical mounting piece is placed to abut with the vertical strut means in assembly. The spring plate can be detached easily from the vertical mounting piece when the scaffold is to be disassembled, and the protrusion can prevent the vertical mounting piece from movement against the vertical strut after the scaffold is assembled.

The exemplary preferred embodiment will be described in detail with reference to the following drawings, in which:

BRIEF DESCRIPTION OF THE DRAWINGS

FIG. 5 is an elevation view of the portion of the scaffold of FIG. 4 after it is assembled;

FIG. 6 shows the scaffold with a fragmentary sectional view taken along line A—A of FIG. 5; and FIG. 7 is a sectional view taken along line B—B of FIG. 5.

DETAILED DESCRIPTION OF THE PREFERRED EMBODIMENT

Figure 1:
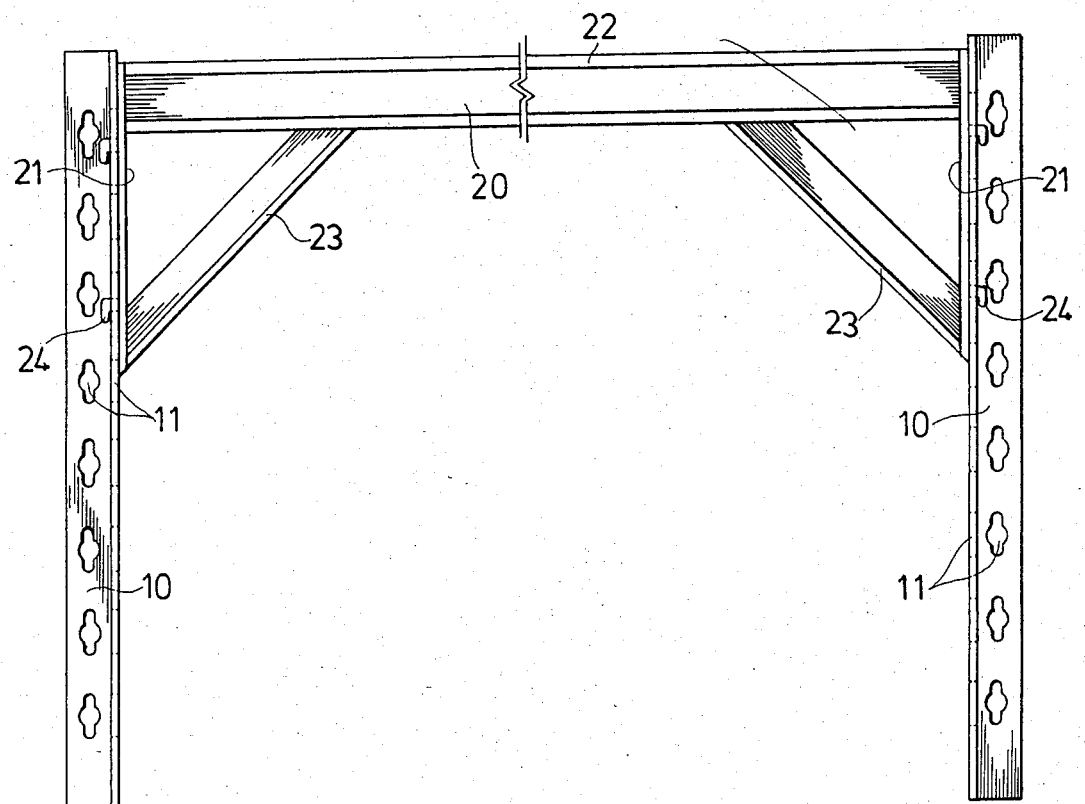
FIGS. 1 and 2 shows a scaffold in the prior art.
Figure 2:
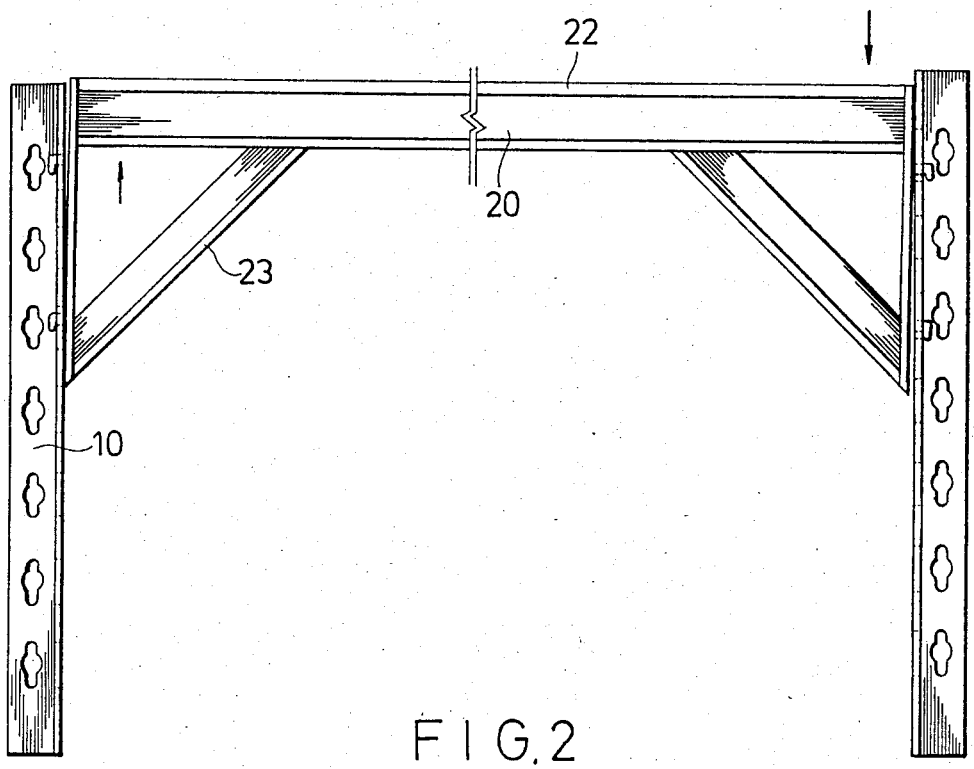
Figure 3:
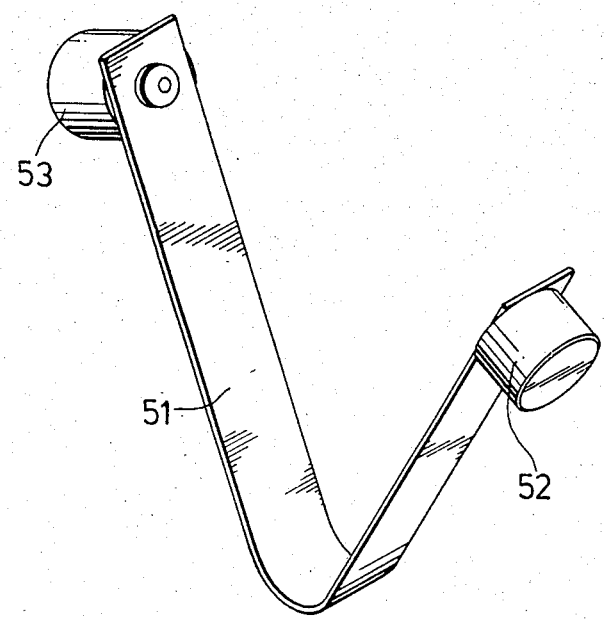
FIG. 3 is a perspective view of a spring plate to be incorporated in a scaffold according to the present invention.
Figure 4:
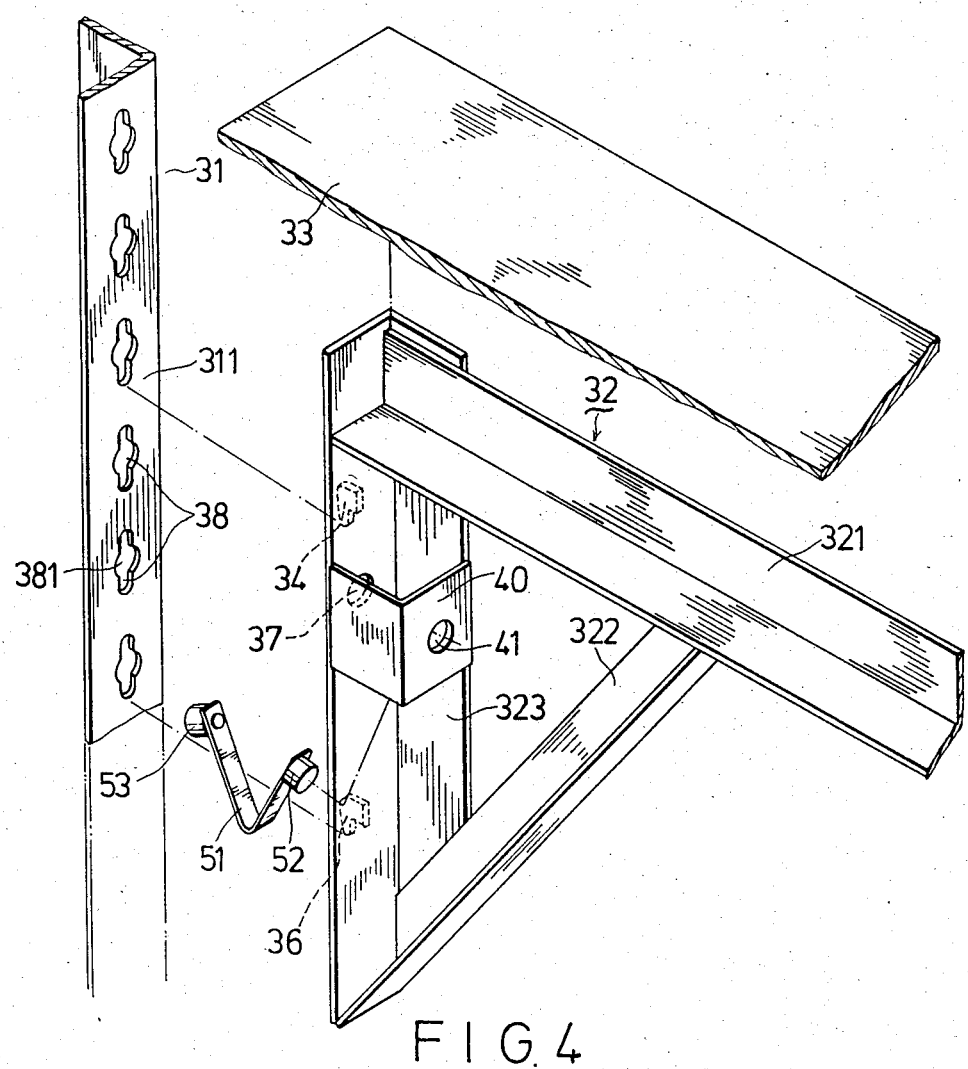
FIG. 4 is an exploded view of a portion of a scaffold according to the present invention.

Referring to FIGS. 3, 4, 5, 6 and 7, there is shown a portion of a scaffold which is constructed and assembled according to the invention. The scaffold is constituted of vertical strut means 31, shelf support means 32 attached transversely to the vertical strut means 31 and shelf means 33 to be disposed on the shelf support means.

The vertical strut means 31 includes vertical struts of L-shaped cross-section each of which has attachment holes 38 provided at intervals along its length. Each of the attachment holes is in an oblong shape with an expanded circular mid-portion 381.

The shelf support means 32 includes horizontal bars 321 of L-shaped cross-section to be disposed transversely between vertical struts 311 for supporting shelves. Vertical mounting pieces 323 of L-shaped cross-section are provided for mounting horizontal bars 321 on vertical struts 311. To vertical mounting pieces 323 and horizontal bars 321 are attahed inclined brace members 322. In assembly, four vertical struts 311 are set upright, and vertical mounting pieces 323 are attached to the vertical struts 311 at intervals. Each vertical mounting piece 323 has two spaced-apart mounting hooks 34 and 36 to engage in two corresponding attachment holes 38 of the vertical strut 311. Each shelf 33 is disposed on two parallel horizontal bars 321 and supported by four vertical mounting pieces 323 at its four corners.

According to the present invention, there is provided a locking means which includes a bracket member in the form of an angle plate 40 of L-shaped cross-section having two opposite edges welded to two opposite edges of each vertical mounting piece at a proper location to define a rectangular space. The angle plate 40 is provided with a first opening 41 in one of its sides opposing one side of the vertical mounting piece, and the vertical mounting piece 323 is provided with a second opening 37 opposite to the first opening 41. A spring plate 51 which is bent to a V-shape with a round edge and is provided with two protrusions 52 and 53 of circular cross-section at its opposite ends, is used to lock the vertical mounting piece 323 against the vertical strut 311. The spring plate is inserted releaseably between the angle plate 40 and the vertical mounting piece 323, and the protrusions 52 and 53 are forced to project into the first and second openings 41 and 37 respectively by the action of the spring plate 40. The protrusion 53 extends through the opening 37 of the vertical mounting piece 323 and is fitted snugly in the expanded circular mid-portion 381 of one of the attachment holes 38 when the vertical mounting piece 232 abuts with the vertical strut means. Since the protrusion 53 is fitted immovably in the hole 38 of the vertical strut 311, the vertical mounting piece 323 is prevented from movement relative to the vertical strut 311.

With the invention thus explained, it is apparent that various modifications and variations can be made without departing from the scope of the invention. It is therefore intended that the invention be limited as indicated in the appended claims.

What I claim is:

1. A scaffold comprising:
vertical strut means with L-shaped cross-section having attachment holes provided at intervals along its length, each of said attachment holes being of an oblong shape with an expanded circular mid-portion;
shelf support means including horizontal bar means with L-shaped cross-section to be disposed transversely between said vertical strut means, vertical mounting pieces with L-shaped cross-section supporting the ends of said horizontal bar means and adapted to be attached to and abut with said vertical strut means, and inclined brace means connected to said vertical mounting pieces and said horizontal bar means, said vertical mounting pieces having mounting hook means to engage in said attachment holes of said vertical strut means;
shelf means to be disposed on said shelf support means; and
an improvement having a locking means which includes a bracket member fixed to said vertical mounting piece and having a face opposing said vertical mounting piece, and a bent spring plate to be held releaseably between said face and said vertical mounting piece, said spring plate having a first end bearing against said said vertical mounting piece and a second end bearing against said face, said first end having a first protrusion adapted to be projected and fitted snugly in said expanded circular mid-portion of one of said attachment holes when said vertical mounting piece is placed to abut with said vertical strut means in assembly, wherein said vertical mounting piece is provided with a first opening through which said first protrusion will projects into said expanded circular mid-portion of said attachment hole.

2. A scaffold assembly as claimed in claim 1, wherein said bracket member is an angle plate of L-shaped cross-section having two opposite edges welded to two opposite edges of said vertical mounting piece to define a rectangular space.

3. A scaffold assembly as claimed in claim 2, wherein said bent spring plate has a V-shaped cross-section and a round edge.

4. A scaffold assembly as claimed in claim 3, wherein said bent spring plate further includes a second protrusion at said second end.

5. A scaffold assembly as claimed in claim 4, wherein said bracket member has a second opening for receiving said second protrusion.

* * * * *